United States Patent
Pehlke et al.

(10) Patent No.: US 12,334,959 B2
(45) Date of Patent: Jun. 17, 2025

(54) APPARATUS AND METHODS FOR DIPLEXING BY ANTENNA STRUCTURE

(71) Applicant: Skyworks Solutions, Inc., Irvine, CA (US)

(72) Inventors: David Richard Pehlke, Westlake Village, CA (US); Paul T. DiCarlo, Marlborough, MA (US); Grant Darcy Poulin, Carp (CA)

(73) Assignee: Skyworks Solutions, Inc., Irvine, CA (US)

( * ) Notice: Subject to any disclaimer, the term of this patent is extended or adjusted under 35 U.S.C. 154(b) by 606 days.

(21) Appl. No.: 17/658,231

(22) Filed: Apr. 6, 2022

(65) Prior Publication Data

US 2022/0329270 A1    Oct. 13, 2022

Related U.S. Application Data

(60) Provisional application No. 63/201,010, filed on Apr. 8, 2021.

(51) Int. Cl.
| | |
|---|---|
| *H04W 88/02* | (2009.01) |
| *H01Q 5/307* | (2015.01) |
| *H01Q 9/04* | (2006.01) |
| *H04B 1/00* | (2006.01) |

(52) U.S. Cl.
CPC .......... *H04B 1/0057* (2013.01); *H01Q 5/307* (2015.01); *H01Q 9/0407* (2013.01)

(58) Field of Classification Search
CPC ................ H04B 1/0057; H04B 1/0064; H01Q 1/2283; H01Q 1/241; H01Q 1/247; H01Q 5/307; H01Q 5/42; H01Q 9/0407; H01Q 9/0421; H01Q 9/42; H01Q 21/061; H01Q 21/065; H01Q 21/28; H04W 88/00; H04W 88/02; H04W 88/04; H04W 88/06
See application file for complete search history.

(56) References Cited

U.S. PATENT DOCUMENTS

| | | | |
|---|---|---|---|
| 4,035,797 A | 7/1977 | Nagy | |
| 6,747,592 B2 | 6/2004 | Nakamura | |
| 7,120,465 B2 | 10/2006 | Skarby et al. | |
| 8,941,547 B2 | 1/2015 | Cho et al. | |
| 10,530,052 B2 * | 1/2020 | Sudo | ........ H01Q 5/50 |
| 2016/0043750 A1 | 2/2016 | Borlenghi | |
| 2019/0372628 A1 * | 12/2019 | Balteanu | ............. H04B 7/0848 |

(Continued)

*Primary Examiner* — Frank Duong
(74) *Attorney, Agent, or Firm* — Knobbe, Martens, Olson & Bear, LLP

(57) ABSTRACT

Apparatus and methods for diplexing by antenna structure are provided. In certain embodiments, a mobile device includes a front end system and an antenna structure. The front end system includes a first signal conditioning circuit configured to condition a first radio frequency signal of a first frequency, and a second signal conditioning circuit configured to condition a second radio frequency signal of a second frequency that is lower than the first frequency. The antenna structure is configured to diplex the first radio frequency signal and the second radio frequency signal, and includes a first antenna configured to handle the first radio frequency signal and a second antenna electromagnetically coupled to the first antenna and configured to handle the second radio frequency signal.

20 Claims, 13 Drawing Sheets

(56) References Cited

U.S. PATENT DOCUMENTS

| | | | |
|---|---|---|---|
| 2019/0386617 A1* | 12/2019 | Naraine | H03F 1/0288 |
| 2022/0173530 A1* | 6/2022 | Ueda | H01Q 1/40 |
| 2022/0311459 A1* | 9/2022 | Pan | H01Q 9/0421 |
| 2022/0311470 A1* | 9/2022 | Goto | H01Q 3/28 |
| 2022/0320751 A1* | 10/2022 | Pehlke | H01Q 21/28 |

* cited by examiner

APPARATUS AND METHODS FOR DIPLEXING BY ANTENNA STRUCTURE

CROSS-REFERENCE TO RELATED APPLICATIONS

This application claims the benefit of priority under 35 U.S.C. § 119 of U.S. Provisional Patent Application No. 63/201,010, filed Apr. 8, 2021 and titled "POWER AMPLIFIER SYSTEMS WITH DIPLEXING BY ANTENNA STRUCTURE," which is herein incorporated by reference in its entirety.

BACKGROUND

Field

Embodiments of the invention relate to electronic systems, and in particular, to radio frequency (RF) electronics.

Description of the Related Technology

Radio frequency (RF) communication systems wirelessly communicate RF signals using antennas.

Examples of RF communication systems that utilize antennas for communication include, but are not limited to mobile phones, tablets, base stations, network access points, laptops, and wearable electronics. RF signals have a frequency in the range from about 30 kHz to 300 GHz, for instance, in the range of about 400 MHz to about 7.125 GHz for Frequency Range 1 (FR1) of the Fifth Generation (5G) communication standard or in the range of about 24.250 GHz to about 71.000 GHz for Frequency Range 2 (FR2) of the 5G communication standard.

SUMMARY

In certain embodiments, the present disclosure relates to a mobile device. The mobile device includes a front end system including a first signal conditioning circuit configured to condition a first radio frequency signal of a first frequency, and a second signal conditioning circuit configured to condition a second radio frequency signal of a second frequency that is lower than the first frequency. The mobile device further includes an antenna structure configured to diplex the first radio frequency signal and the second radio frequency signal. The antenna structure includes a first antenna configured to handle the first radio frequency signal and a second antenna electromagnetically coupled to the first antenna and configured to handle the second radio frequency signal.

In various embodiments, the first radio frequency signal is a first carrier aggregation signal and the second radio frequency signal is a second carrier aggregation signal.

In several embodiments, the first antenna is a first patch antenna and the second antenna is a second patch antenna. According to a number of embodiments, the first patch antenna is rectangular-shaped and the second patch antenna is L-shaped. In accordance with various embodiments, the first frequency is between 24 gigahertz and 52 gigahertz, and the second frequency is between 52 gigahertz and 71 gigahertz. According to some embodiments, the antenna structure further includes a radial stub connected to the first antenna.

In various embodiments, the first signal conditioning circuit includes a first power amplifier configured to output the first radio frequency signal, and the second signal conditioning circuit includes a second power amplifier configured to output the second radio frequency signal.

In several embodiments, the first signal conditioning circuit includes a first low noise amplifier is configured to receive the first radio frequency signal, and the second signal conditioning circuit includes a second low noise amplifier configured to receive the second radio frequency signal.

In certain embodiments, the present disclosure relates to a radio frequency module. The radio frequency module includes a module substrate. The radio frequency module further includes a semiconductor die attached to the module substrate and including a first signal conditioning circuit configured to condition a first radio frequency signal of a first frequency, and a second signal conditioning circuit configured to condition a second radio frequency signal of a second frequency that is lower than the first frequency. The radio frequency module further includes an antenna structure on the module substrate and configured to diplex the first radio frequency signal and the second radio frequency signal. The antenna structure includes a first antenna configured to handle the first radio frequency signal and a second antenna electromagnetically coupled to the first antenna and configured to handle the second radio frequency signal.

In some embodiments, the first radio frequency signal is a first carrier aggregation signal and the second radio frequency signal is a second carrier aggregation signal.

In several embodiments, the first antenna is a first patch antenna and the second antenna is a second patch antenna. According to a number of embodiments, the first patch antenna is rectangular-shaped and the second patch antenna is L-shaped. In accordance with various embodiments, the antenna structure further includes a radial stub connected to the first antenna.

In various embodiments, the first signal conditioning circuit includes a first power amplifier configured to output the first radio frequency signal, and the second signal conditioning circuit includes a second power amplifier configured to output the second radio frequency signal.

In some embodiments, the first signal conditioning circuit includes a first low noise amplifier configured to receive the first radio frequency signal, and the second signal conditioning circuit includes a second low noise amplifier configured to receive the second radio frequency signal.

In certain embodiments, the present disclosure relates to a method of wireless communication in a mobile device. The method includes conditioning a first radio frequency signal of a first frequency using a first signal conditioning circuit, conditioning a second radio frequency signal of a second frequency that is lower than the first frequency using a second signal conditioning circuit, and diplexing the first radio frequency signal and the second radio frequency signal using an antenna structure that includes a first antenna and a second antenna that are electromagnetically coupled to one another, including handling the first radio frequency signal using the first antenna and handling the second radio frequency signal using the second antenna.

In various embodiments, the first radio frequency signal is a first carrier aggregation signal and the second radio frequency signal is a second carrier aggregation signal.

In several embodiments, the first antenna is a first patch antenna and the second antenna is a second patch antenna, the method further including tuning the first patch antenna using a first radial stub connected to the first antenna.

In some embodiments, conditioning the first radio frequency signal includes amplifying the first radio frequency signal using a first power amplifier and providing the first radio frequency signal as an output of the first power amplifier.

In various embodiments, conditioning the first radio frequency signal includes receiving the first radio frequency signal as an input to a first low noise amplifier and amplifying the first radio frequency signal using the first low noise amplifier.

DETAILED DESCRIPTION OF EMBODIMENTS

Figure 1:
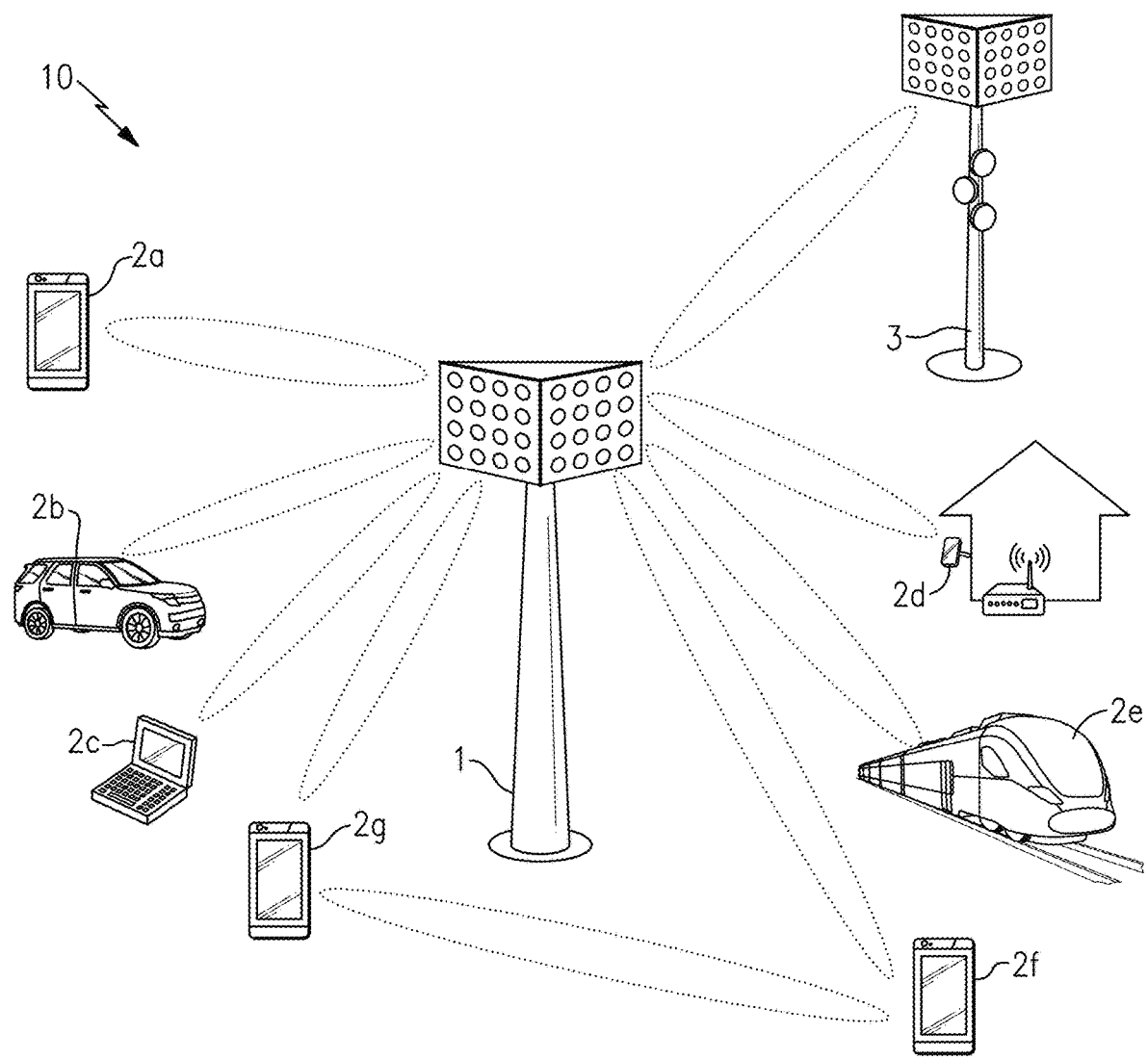
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and introduced Phase 2 of 5G technology in Release 16. Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, a second mobile device 2f, and a third mobile device 2g.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 10 can be implemented to support self-fronthaul and/or self-backhaul (for instance, as between mobile device 2g and mobile device 2f).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz. Cellular user equipment can communicate using beamforming and/or other techniques over a wide range of frequencies, including, for example, FR2-1 (24 GHz to 52 GHz), FR2-2 (52 GHz to 71 GHz), and/or FR1 (400 MHz to 7125 MHz).

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

Figure 2A:
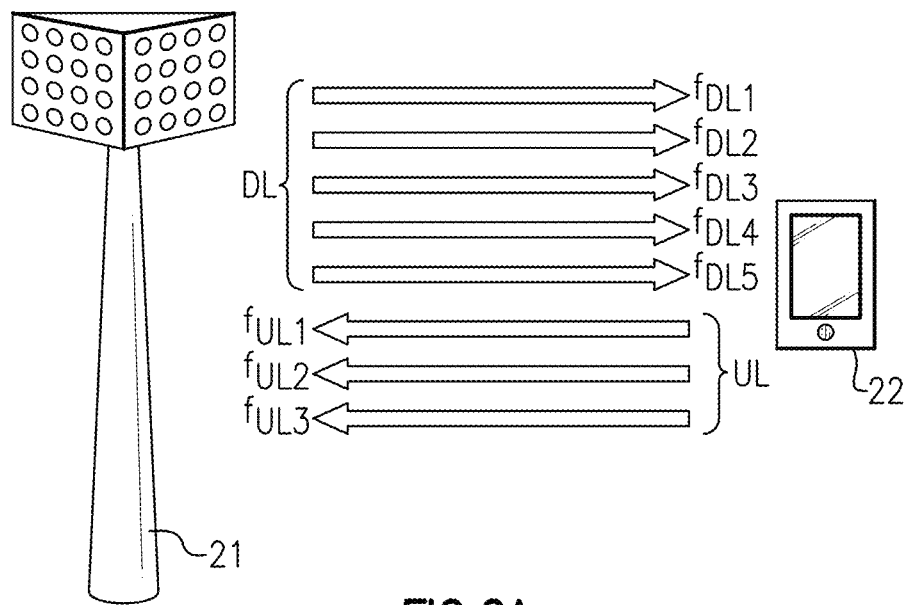
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
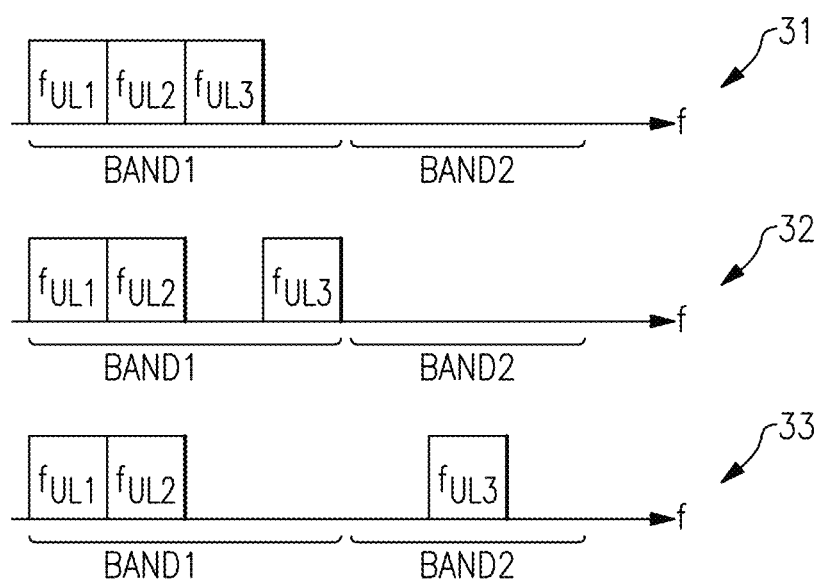
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier $f_{UL1}$, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates inter-band non-contiguous carrier aggregation, in which component carriers that are non-adjacent in frequency and in multiple frequency bands are aggregated. For example, the third carrier aggregation scenario 33 depicts aggregation of component carriers $f_{UL1}$ and $f_{UL2}$ of a first frequency band BAND1 with component carrier $f_{UL3}$ of a second frequency band BAND2.

Figure 2C:
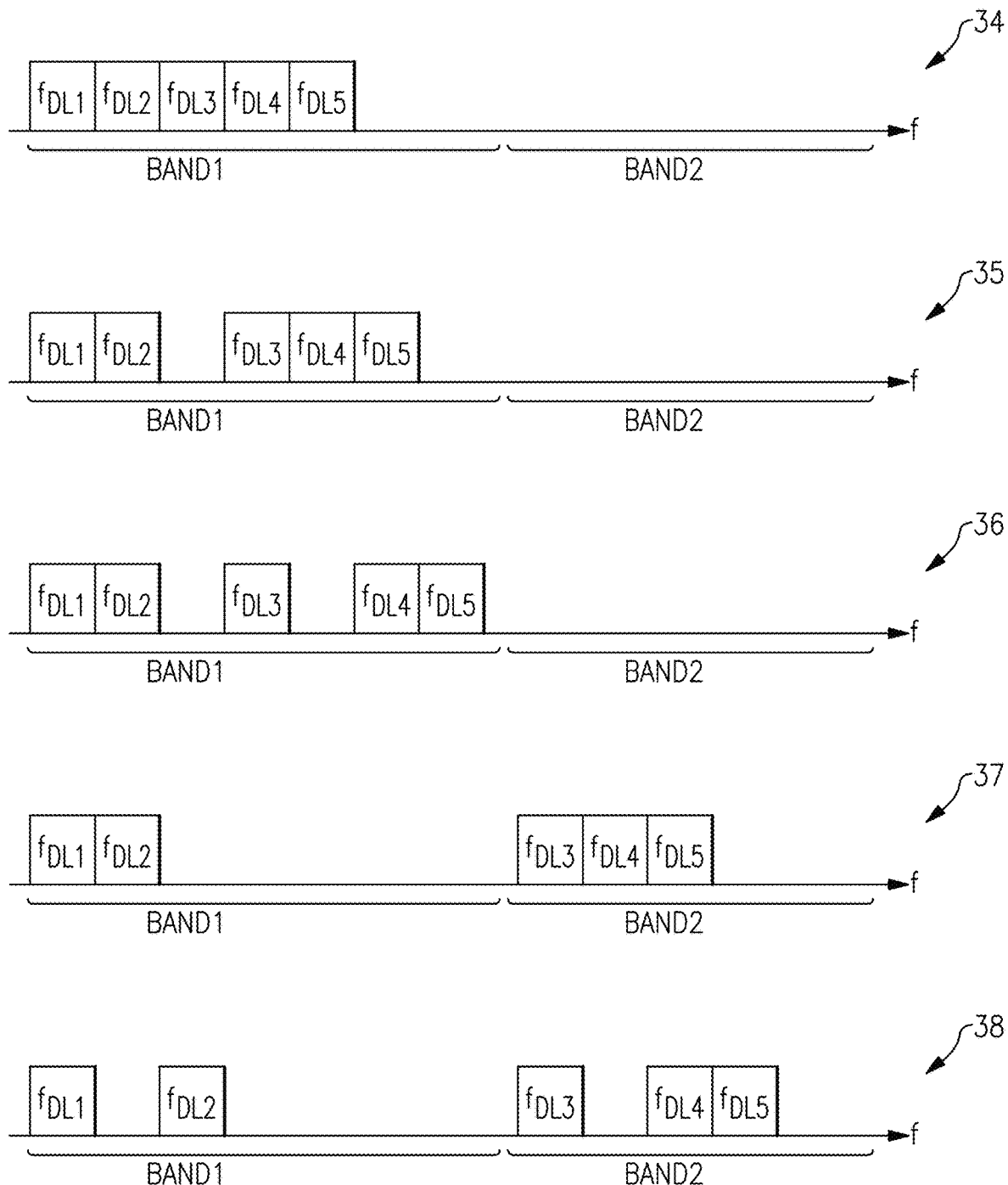
FIG. 2C illustrates various examples of downlink carrier aggregation for the communication link of FIG. 2A.

FIG. 2C illustrates various examples of downlink carrier aggregation for the communication link of FIG. 2A. The examples depict various carrier aggregation scenarios 34-38 for different spectrum allocations of a first component carrier $f_{DL1}$, a second component carrier $f_{DL2}$, a third component carrier $f_{DL3}$, a fourth component carrier $f_{DL4}$, and a fifth component carrier $f_{DL5}$. Although FIG. 2C is illustrated in the context of aggregating five component carriers, carrier aggregation can be used to aggregate more or fewer carriers. Moreover, although illustrated in the context of downlink, the aggregation scenarios are also applicable to uplink.

The first carrier aggregation scenario 34 depicts aggregation of component carriers that are contiguous and located within the same frequency band. Additionally, the second carrier aggregation scenario 35 and the third carrier aggregation scenario 36 illustrates two examples of aggregation that are non-contiguous, but located within the same frequency band. Furthermore, the fourth carrier aggregation scenario 37 and the fifth carrier aggregation scenario 38 illustrates two examples of aggregation in which component carriers that are non-adjacent in frequency and in multiple frequency bands are aggregated. As a number of aggregated component carriers increases, a complexity of possible carrier aggregation scenarios also increases.

With reference to FIGS. 2A-2C, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and secondary cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as WiFi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid WiFi users and/or to coexist with WiFi users. Enhanced license assisted access (eLAA) refers to an evolution of LAA that aggregates licensed and unlicensed spectrum for both downlink and uplink. Furthermore, NR-U can operate on top of LAA/eLAA over a 5 GHz band (5150 to 5925 MHz) and/or a 6 GHz band (5925 MHz to 7125 MHz).

Figure 3A:
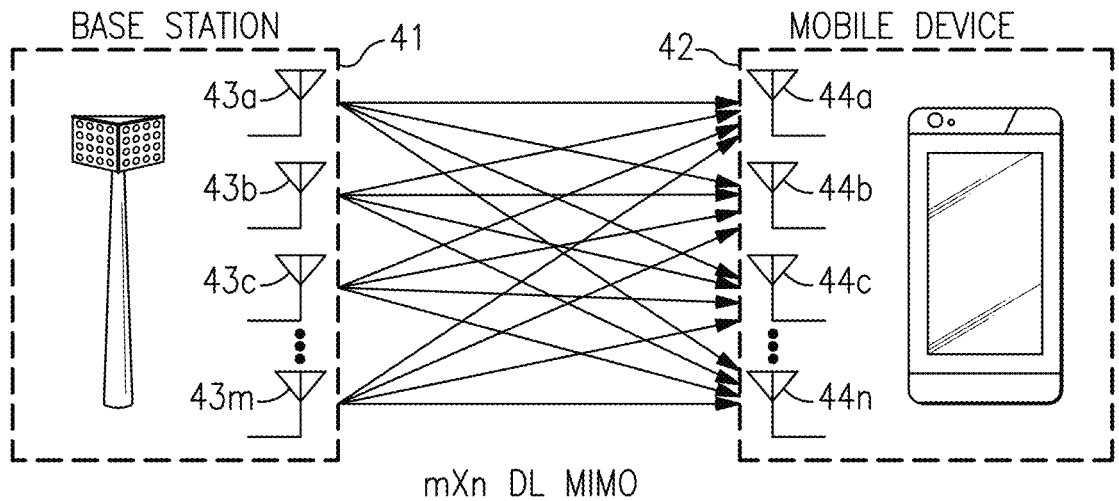
FIG. 3A is a schematic diagram of one example of a downlink channel using multi-input and multi-output (MIMO) communications.
Figure 3B:
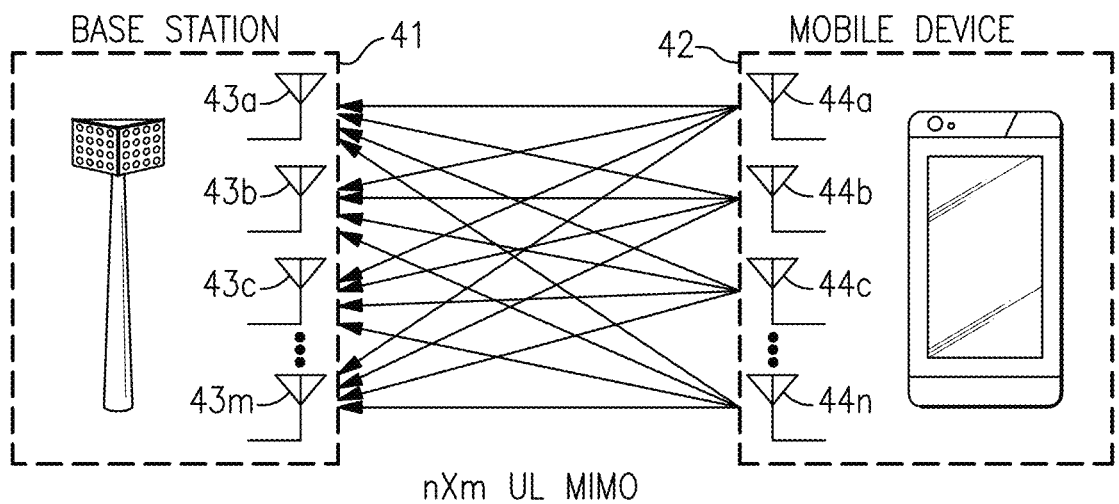
FIG. 3B is schematic diagram of one example of an uplink channel using MIMO communications.

FIG. 3A is a schematic diagram of one example of a downlink channel using multi-input and multi-output (MIMO) communications. FIG. 3B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 3A, downlink MIMO communications are provided by transmitting using M antennas $43a$, $43b$, $43c$, . . . $43m$ of the base station $41$ and receiving using N antennas $44a$, $44b$, $44c$, . . . $44n$ of the mobile device $42$. Accordingly, FIG. 3A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 3B, uplink MIMO communications are provided by transmitting using N antennas $44a$, $44b$, $44c$, . . . $44n$ of the mobile device $42$ and receiving using M antennas $43a$, $43b$, $43c$, . . . $43m$ of the base station $41$. Accordingly, FIG. 3B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 3C:
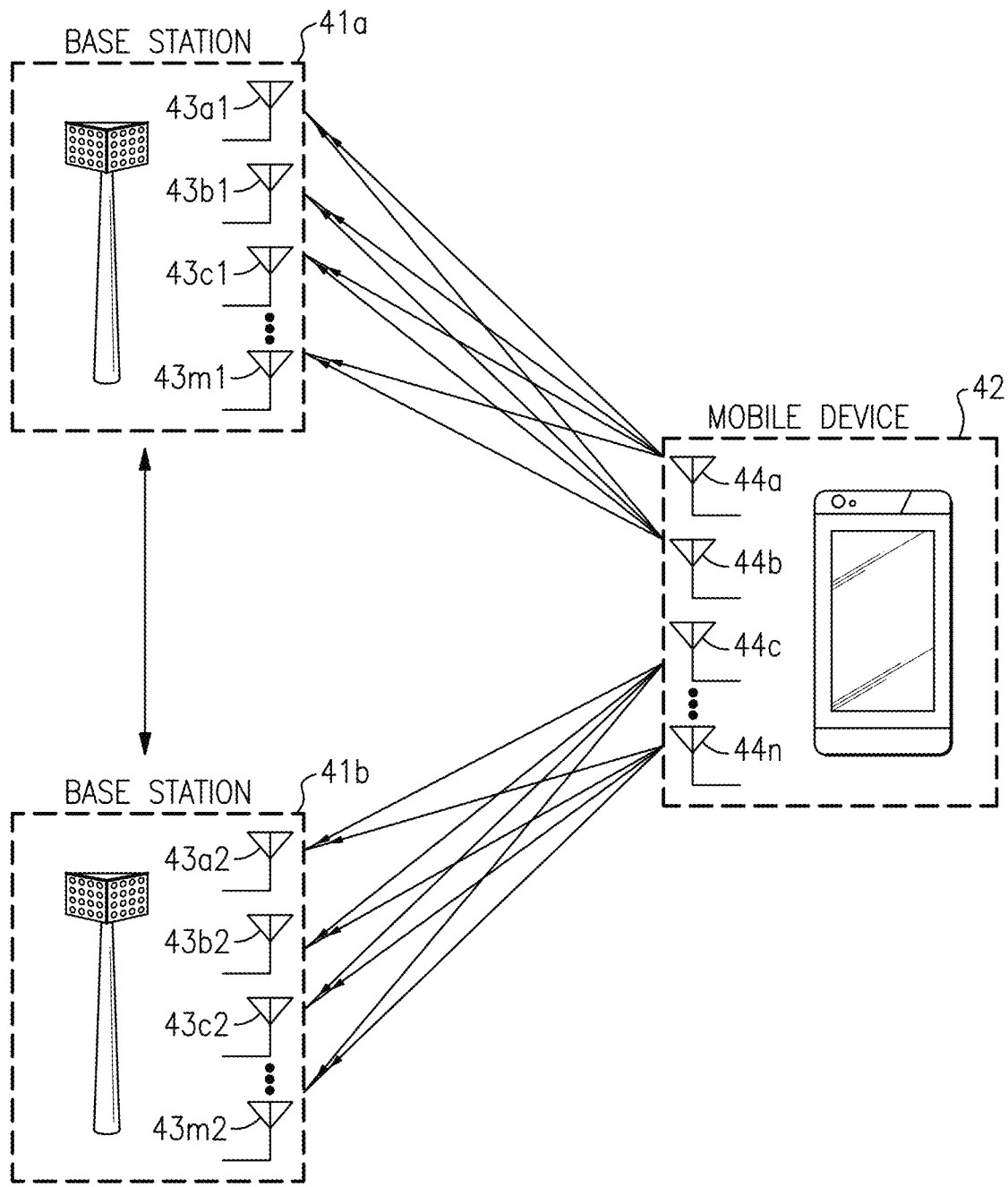
FIG. 3C is schematic diagram of another example of an uplink channel using MIMO communications.

FIG. 3C is schematic diagram of another example of an uplink channel using MIMO communications. In the example shown in FIG. 3C, uplink MIMO communications are provided by transmitting using N antennas $44a$, $44b$, $44c$, . . . $44n$ of the mobile device $42$. Additional a first portion of the uplink transmissions are received using M antennas $43a1$, $43b1$, $43c1$, . . . $43m1$ of a first base station $41a$, while a second portion of the uplink transmissions are received using M antennas $43a2$, $43b2$, $43c2$, . . . $43m2$ of a second base station $41b$. Additionally, the first base station $41a$ and the second base station $41b$ communication with one another over wired, optical, and/or wireless links.

The MIMO scenario of FIG. 3C illustrates an example in which multiple base stations cooperate to facilitate MIMO communications.

Figure 4A:
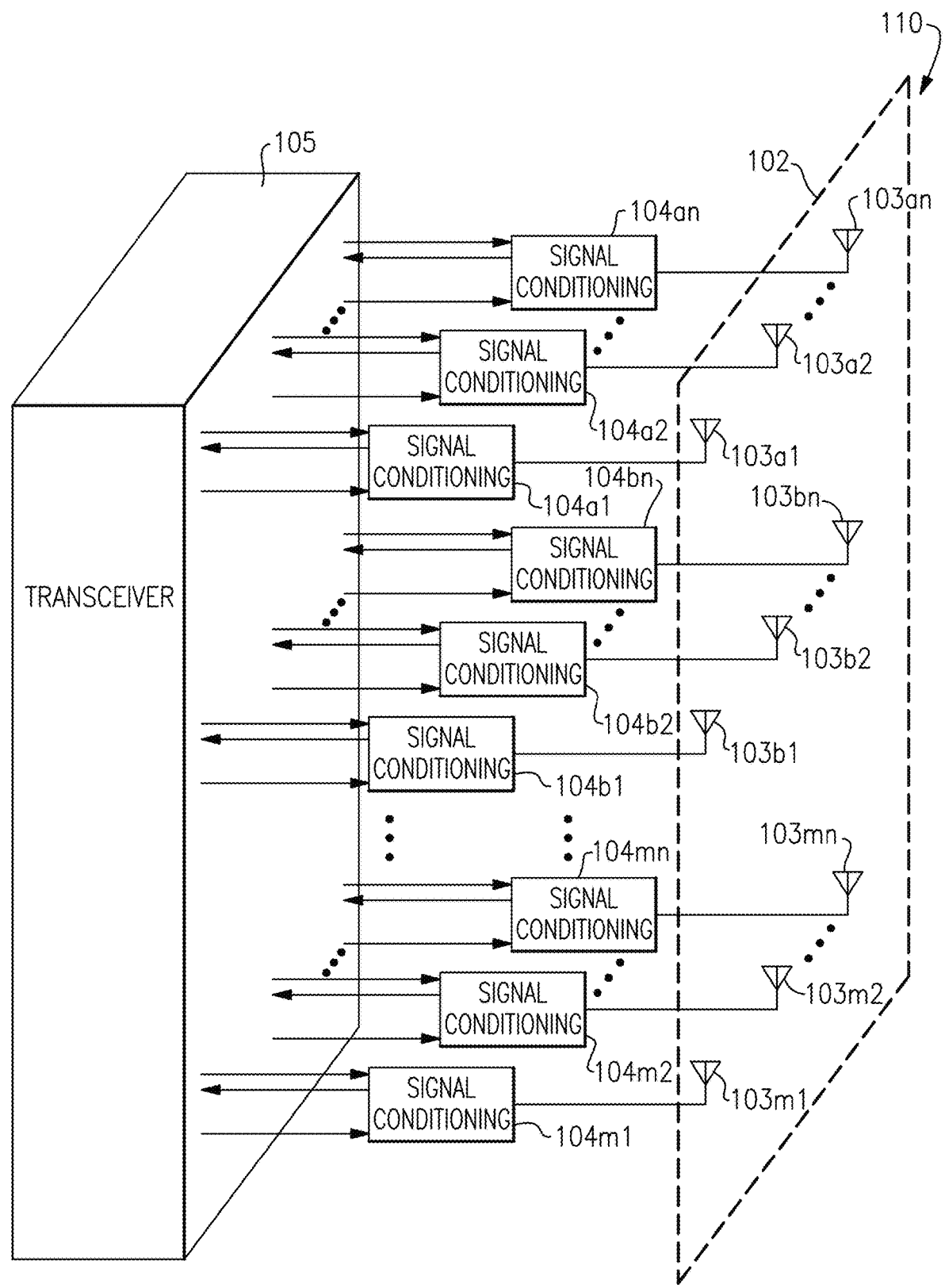
FIG. 4A is a schematic diagram of one example of a communication system that operates with beamforming.

FIG. 4A is a schematic diagram of one example of a communication system $110$ that operates with beamforming. The communication system $110$ includes a transceiver $105$, signal conditioning circuits $104a1$, $104a2$ . . . $104an$, $104b1$, $104b2$ . . . $104bn$, $104m1$, $104m2$ . . . $104mn$, and an antenna array $102$ that includes antenna elements $103a1$, $103a2$ . . . $103an$, $103b1$, $103b2$ . . . $103bn$, $103m1$, $103m2$ . . . $103mn$.

Communications systems that communicate using millimeter wave carriers (for instance, 30 GHz to 300 GHz), centimeter wave carriers (for instance, 3 GHz to 30 GHz), and/or other frequency carriers can employ an antenna array to provide beam formation and directivity for transmission and/or reception of signals.

For example, in the illustrated embodiment, the communication system $110$ includes an array $102$ of m×n antenna elements, which are each controlled by a separate signal conditioning circuit, in this embodiment. As indicated by the ellipses, the communication system $110$ can be implemented with any suitable number of antenna elements and signal conditioning circuits.

With respect to signal transmission, the signal conditioning circuits can provide transmit signals to the antenna array $102$ such that signals radiated from the antenna elements combine using constructive and destructive interference to generate an aggregate transmit signal exhibiting beam-like qualities with more signal strength propagating in a given direction away from the antenna array $102$.

In the context of signal reception, the signal conditioning circuits process the received signals (for instance, by separately controlling received signal phases) such that more signal energy is received when the signal is arriving at the antenna array $102$ from a particular direction. Accordingly, the communication system $110$ also provides directivity for reception of signals.

The relative concentration of signal energy into a transmit beam or a receive beam can be enhanced by increasing the size of the array. For example, with more signal energy focused into a transmit beam, the signal is able to propagate for a longer range while providing sufficient signal level for RF communications. For instance, a signal with a large proportion of signal energy focused into the transmit beam can exhibit high effective isotropic radiated power (EIRP).

In the illustrated embodiment, the transceiver $105$ provides transmit signals to the signal conditioning circuits and processes signals received from the signal conditioning circuits. As shown in FIG. 4A, the transceiver $105$ generates control signals for the signal conditioning circuits. The control signals can be used for a variety of functions, such as controlling the gain and phase of transmitted and/or received signals to control beamforming.

Figure 4B:
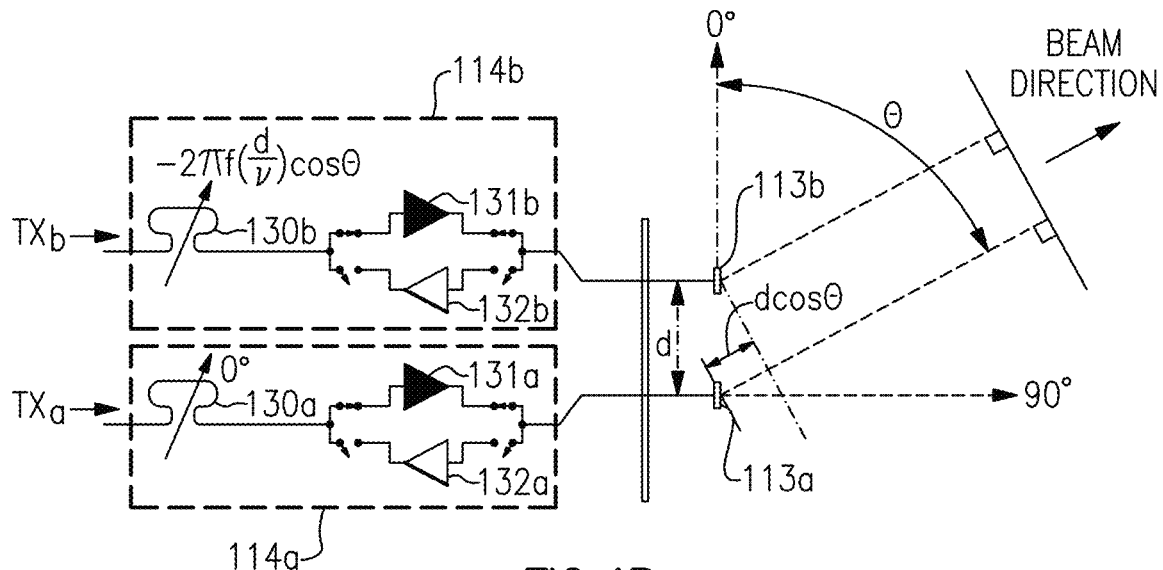
FIG. 4B is a schematic diagram of one example of beamforming to provide a transmit beam.

FIG. 4B is a schematic diagram of one example of beamforming to provide a transmit beam. FIG. 4B illustrates a portion of a communication system including a first signal conditioning circuit $114a$, a second signal conditioning circuit $114b$, a first antenna element $113a$, and a second antenna element $113b$.

Although illustrated as included two antenna elements and two signal conditioning circuits, a communication system can include additional antenna elements and/or signal conditioning circuits. For example, FIG. 4B illustrates one embodiment of a portion of the communication system 110 of FIG. 4A.

The first signal conditioning circuit 114a includes a first phase shifter 130a, a first power amplifier 131a, a first low noise amplifier (LNA) 132a, and switches for controlling selection of the power amplifier 131a or LNA 132a. Additionally, the second signal conditioning circuit 114b includes a second phase shifter 130b, a second power amplifier 131b, a second LNA 132b, and switches for controlling selection of the power amplifier 131b or LNA 132b.

Although one embodiment of signal conditioning circuits is shown, other implementations of signal conditioning circuits are possible. For instance, in one example, a signal conditioning circuit includes one or more band filters, duplexers, and/or other components.

In the illustrated embodiment, the first antenna element 113a and the second antenna element 113b are separated by a distance d. Additionally, FIG. 4B has been annotated with an angle Θ, which in this example has a value of about 90° when the transmit beam direction is substantially perpendicular to a plane of the antenna array and a value of about 0° when the transmit beam direction is substantially parallel to the plane of the antenna array.

By controlling the relative phase of the transmit signals provided to the antenna elements 113a, 113b, a desired transmit beam angle Θ can be achieved. For example, when the first phase shifter 130a has a reference value of 0°, the second phase shifter 130b can be controlled to provide a phase shift of about $-2\pi f(d/v)\cos\Theta$ radians, where f is the fundamental frequency of the transmit signal, d is the distance between the antenna elements, v is the velocity of the radiated wave, and π is the mathematic constant pi.

In certain implementations, the distance d is implemented to be about ½λ, where λ is the wavelength of the fundamental component of the transmit signal. In such implementations, the second phase shifter 130b can be controlled to provide a phase shift of about $-\pi\cos\Theta$ radians to achieve a transmit beam angle Θ.

Accordingly, the relative phase of the phase shifters 130a, 130b can be controlled to provide transmit beamforming. In certain implementations, a baseband processor and/or a transceiver (for example, the transceiver 105 of FIG. 4A) controls phase values of one or more phase shifters and gain values of one or more controllable amplifiers to control beamforming.

Figure 4C:
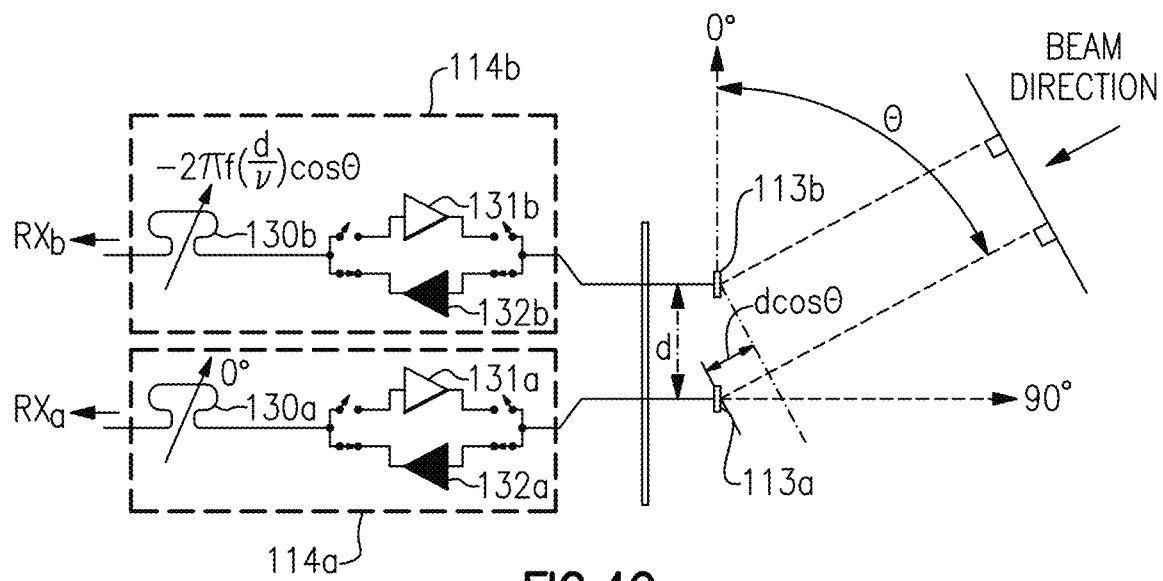
FIG. 4C is a schematic diagram of one example of beamforming to provide a receive beam.

FIG. 4C is a schematic diagram of one example of beamforming to provide a receive beam. FIG. 4C is similar to FIG. 4B, except that FIG. 4C illustrates beamforming in the context of a receive beam rather than a transmit beam.

As shown in FIG. 4C, a relative phase difference between the first phase shifter 130a and the second phase shifter 130b can be selected to about equal to $-2\pi f(d/v)\cos\Theta$ radians to achieve a desired receive beam angle Θ. In implementations in which the distance d corresponds to about ½λ, the phase difference can be selected to about equal to $-\pi\cos\Theta$ radians to achieve a receive beam angle Θ.

Although various equations for phase values to provide beamforming have been provided, other phase selection values are possible, such as phase values selected based on implementation of an antenna array, implementation of signal conditioning circuits, and/or a radio environment.

Figure 5A:
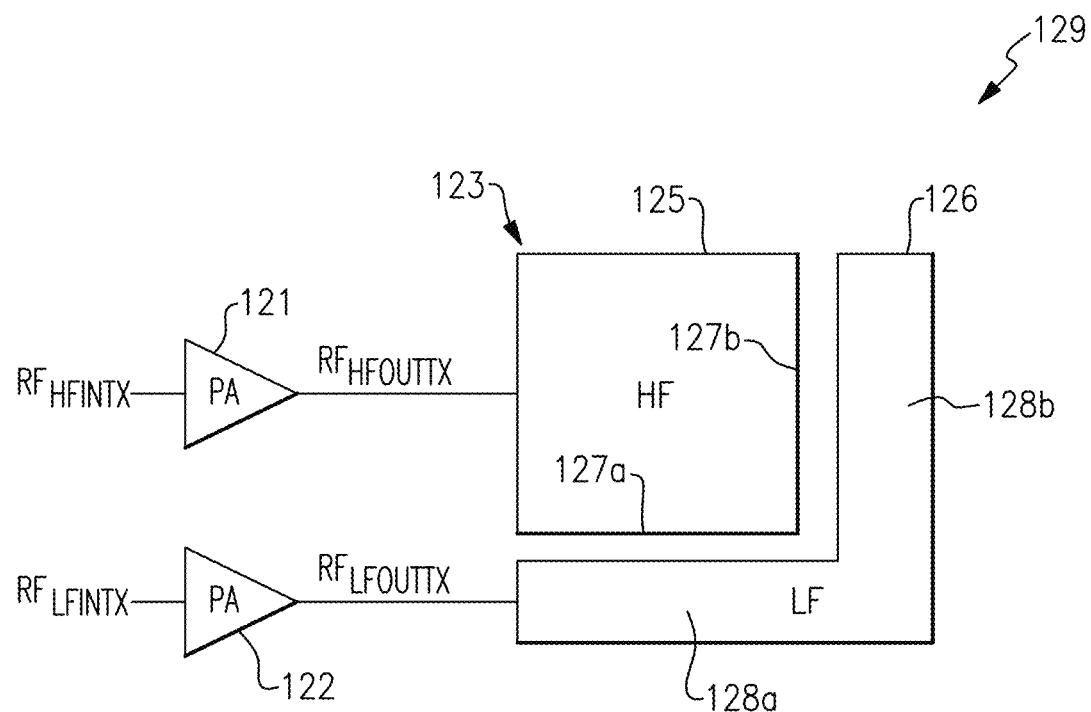
FIG. 5A is a schematic diagram of an antenna system with diplexing according to one embodiment.

FIG. 5A is a schematic diagram of an antenna system 129 according to one embodiment. The antenna system 129 includes a high frequency power amplifier 121, a low frequency power amplifier 122, and an antenna structure 123 including a high frequency antenna 125 and a low frequency antenna 126.

As shown in FIG. 5A, the high frequency power amplifier 121 amplifies a high frequency RF input signal $RF_{HFINTX}$ (from a transceiver) to generate a high frequency RF output signal $RF_{HFOUTTX}$ that is provided to the high frequency antenna 125. Additionally, the low frequency power amplifier 122 amplifies a low frequency RF input signal $RF_{LFINTX}$ (from the transceiver) to generate a low frequency RF output signal $RF_{LFOUTTX}$ that is provided to the low frequency antenna 126. The high frequency RF output signal $RF_{HFOUTTX}$ has a higher frequency than the low frequency RF output signal $RF_{LFOUTTX}$.

With continuing reference to FIG. 5A, the high frequency antenna 125 and the low frequency antenna 126 are closely spaced and electromagnetically coupled to provide an antenna structure 123 that serves as a diplexer. Thus, rather than including an explicit diplexer, the antenna structure 123 provides a diplexing function for combining the high frequency RF output signal $RF_{HFOUTTX}$ and the low frequency RF output signal $RF_{LFOUTTX}$. Although shown in the context of signal transmission, the antenna structure 123 can also be used for diplexing in the context of signal reception.

In certain implementations, the high frequency RF output signal $RF_{HFOUTTX}$ and the low frequency RF output signal $RF_{LFOUTTX}$ correspond to signals associated with carrier aggregation. Such carrier aggregation can be in FR1 and/or FR2.

In certain embodiments, the high frequency antenna 125 is a first patch antenna and the low frequency antenna 126 is a second patch antenna. In certain implementations, the first patch antenna is rectangular (or square) shaped, while the second patch antenna is L-shaped (with or without rotation and/or mirroring). For example, in the embodiment of FIG. 5A when implemented as patch antennas, the second patch antenna 126 includes a first portion 128a along a first or bottom side 127a of the first patch antenna 125 and a second portion 128b along a second or right side 127b of the first patch antenna 125. In certain implementations, an outer perimeter collectively around the first patch antenna and the second patch antenna is substantially rectangular (or square).

The high frequency power amplifier 121 can be included as part of a high frequency signal conditioning circuit and the low frequency power amplifier 122 can be included as part of a low frequency signal conditioning circuit. Such signal conditioning circuits can be included as part of an RF front end circuit.

In certain embodiments, the antenna system 129 is used for beamforming. Such beamforming can be on FR1 and/or FR2 frequencies. In certain implementations, the low frequency RF output signal $RF_{LFOUTTX}$ is in FR2-1 (24 GHz to 52 GHz) while the high frequency RF output signal $RF_{HFOUTTX}$ is in FR2-2 (52 GHz to 71 GHz).

Table 1 below depicts various examples of 5G FR2 frequency bands, and correspond to example frequency bands for the low frequency RF output signal $RF_{LFOUTTX}$ and/or the high frequency RF output signal $RF_{HFOUTTX}$ for the case in which either or both of these signals are in FR2.

TABLE 1

| 5G Frequency Band | Band Duplex Type | UL/DL Low [MHz] | UL/DL High [MHz] |
|---|---|---|---|
| n257 | TDD | 26500 | 29500 |
| n258 | TDD | 24250 | 27500 |
| n259 | TDD | 39500 | 43500 |
| n260 | TDD | 37000 | 40000 |
| n261 | TDD | 27500 | 28350 |
| n262 | TDD | 47200 | 48200 |
| n263 | TDD | 57000 | 71000 |

Figure 5B:
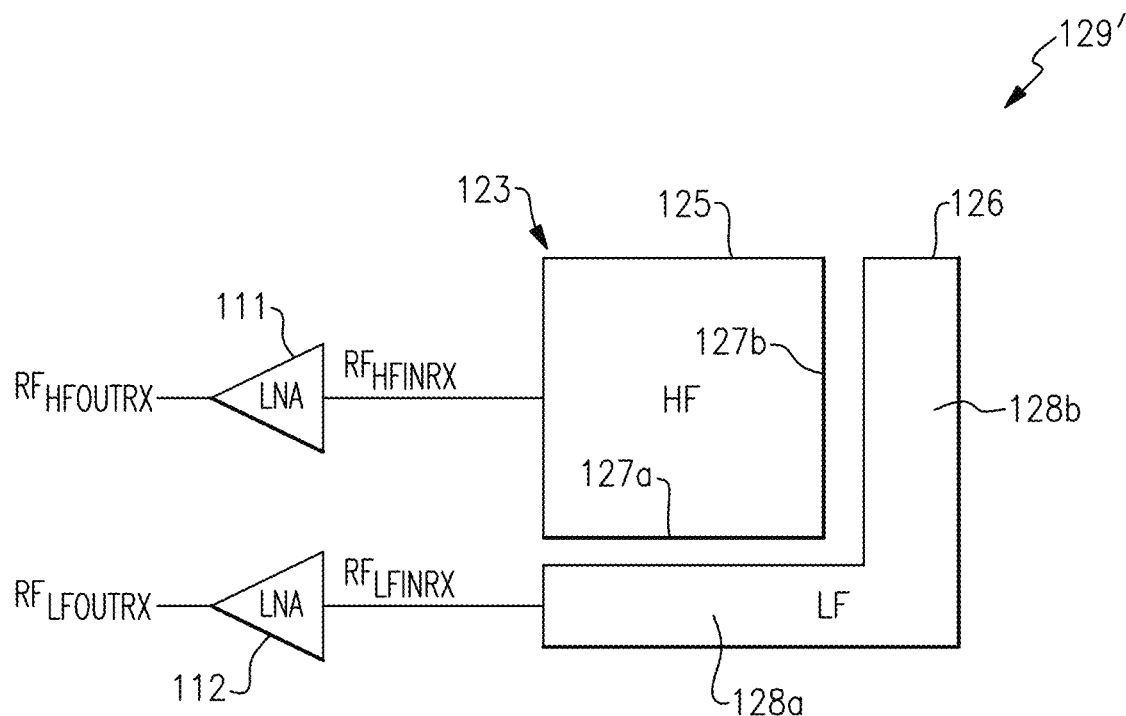
FIG. 5B is a schematic diagram of an antenna system with diplexing according to another embodiment.

FIG. 5B is a schematic diagram of an antenna system 129' with diplexing according to another embodiment. The antenna system 129' includes a high frequency LNA 111, a low frequency LNA 112, and an antenna structure 123 including a high frequency antenna 125 and a low frequency antenna 126.

As shown in FIG. 5B, the high frequency LNA 111 amplifies a high frequency RF input signal $RF_{HFINRX}$ received from the high frequency antenna 125 to generate a high frequency RF output signal $RF_{HFOUTRX}$. Additionally, the low frequency LNA 112 amplifies a low frequency RF input signal $RF_{LFINRX}$ received from the low frequency antenna 126 to generate a low frequency RF output signal $RF_{LFOUTRX}$. The high frequency RF output signal $RF_{HFOUTRX}$ has a higher frequency than the low frequency RF output signal $RF_{LFOUTRX}$.

The high frequency LNA 111 can be included as part of a high frequency signal conditioning circuit and the low frequency LNA 112 can be included as part of a low frequency signal conditioning circuit. Such signal conditioning circuits can be part of an RF front end.

The antenna system 129' of FIG. 5B is similar to the antenna system 129 of FIG. 5A, except that the antenna system 129' is implemented with LNAs for receive rather than power amplifiers for transmit. The antenna systems herein can be used for transmit only, receive only, or for both transmit and receive.

Figure 5C:
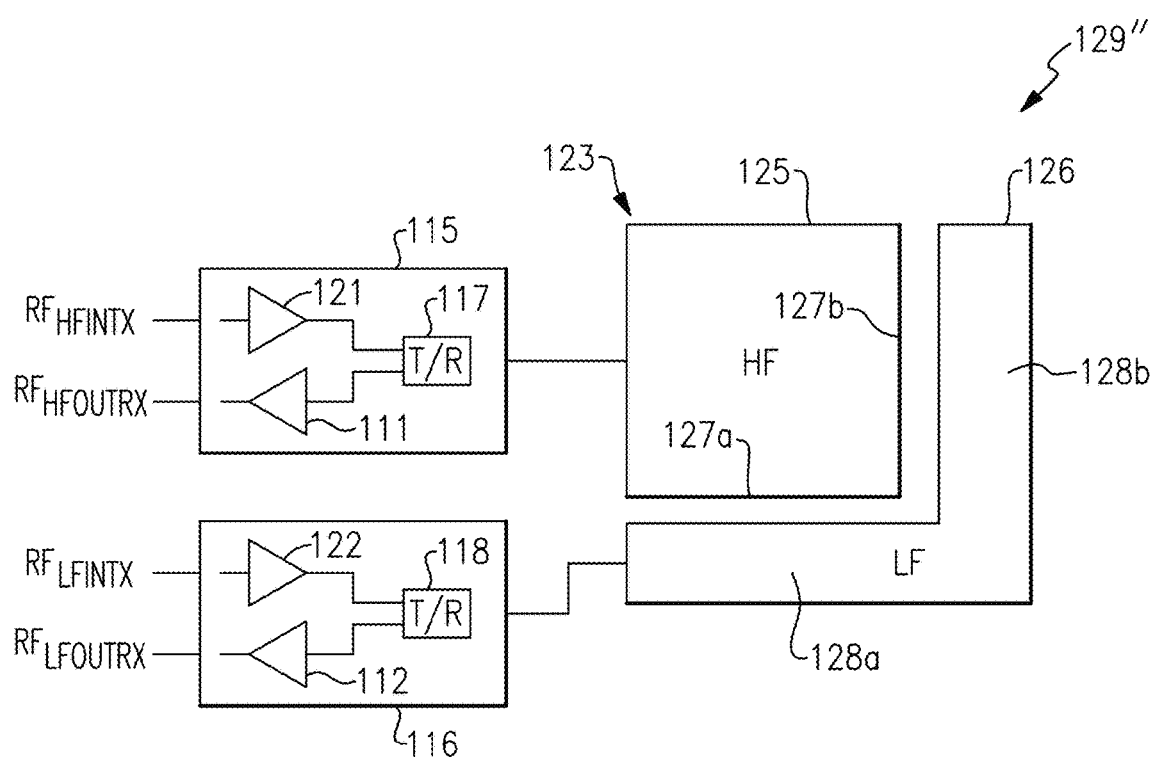
FIG. 5C is a schematic diagram of an antenna system with diplexing according to another embodiment.

FIG. 5C is a schematic diagram of an antenna system 129" with diplexing according to another embodiment. The antenna system 129" includes a high frequency signal conditioning circuit 115, a low frequency signal conditioning circuit 116, and an antenna structure 123 including a high frequency antenna 125 and a low frequency antenna 126.

The antenna system 129" is implemented with circuitry for both transmit and receive for each of high frequency and low frequency. For example, the high frequency signal conditioning circuit 115 includes a high frequency power amplifier 121, a high frequency LNA 111, and a transmit/receive (T/R) switch 117 for selectively connecting an output of the power amplifier 121 or an input of the LNA 111 to the high frequency antenna 125. Additionally, the low frequency signal conditioning circuit 116 includes a low frequency power amplifier 122, a low frequency LNA 112, and a T/R switch 118 for selectively connecting an output of the power amplifier 122 or an input of the LNA 112 to the low frequency antenna 126.

Figure 5D:
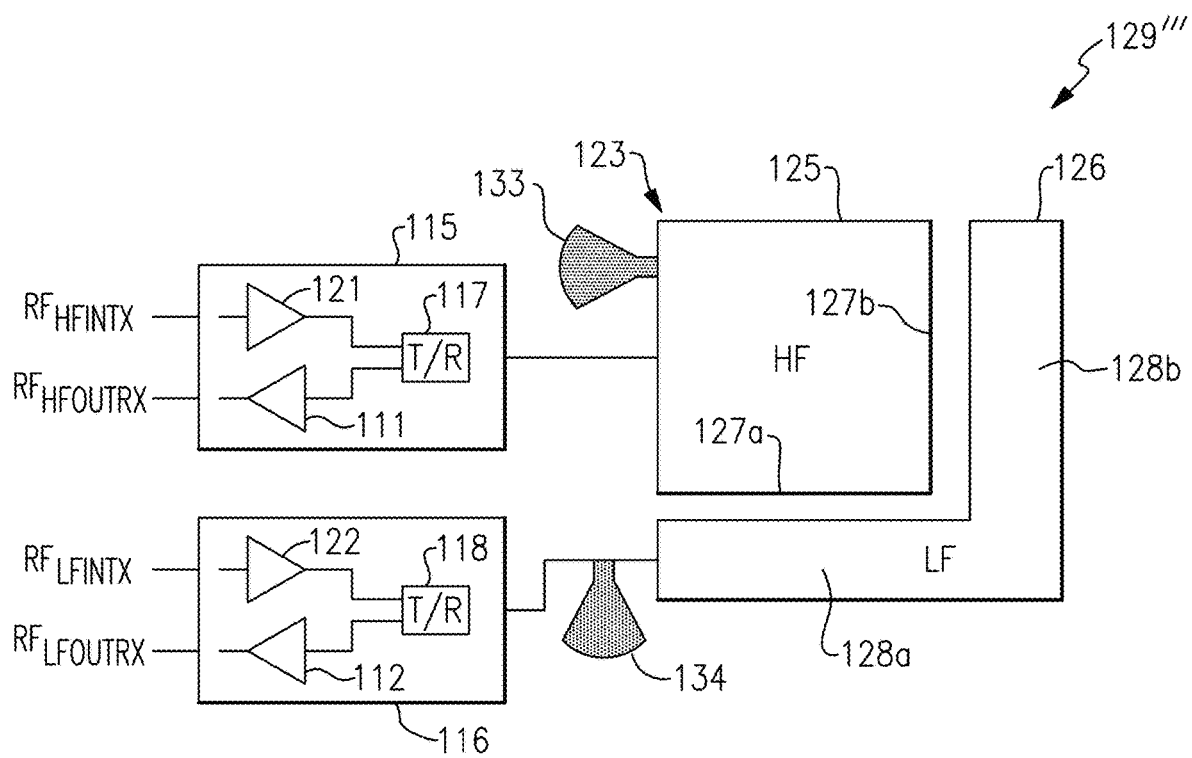
FIG. 5D is a schematic diagram of an antenna system with diplexing according to another embodiment.

FIG. 5D is a schematic diagram of an antenna system 129''' with diplexing according to another embodiment. The antenna system 129''' includes a high frequency signal conditioning circuit 115, a low frequency signal conditioning circuit 116, a first radial stub 133, and a second radial stub 134, and an antenna structure 123 including a high frequency antenna 125 and a low frequency antenna 126.

The antenna system 129''' of FIG. 5D is similar to the antenna system 129" of FIG. 5C, except that the 129''' of FIG. 5D further includes the first radial stub 133 extending from the high frequency antenna 125 and the second radial stub 134 extending from a signal feed to the low frequency antenna 126. Including one or more radial stubs can aid in tuning the antenna structure 123 and/or otherwise enhancing performance. As shown in FIG. 5D, the radial stubs can extend from the antennas themselves and/or from the signal feeds of the antennas. Although FIG. 5D depicts a configuration in which one radial stub extends from an antenna and another radial stub extends from an antenna feed, the teachings herein are also applicable to configurations in which radial stubs extend from both antennas and/or radial stubs extend from both signal feeds.

Figure 5E:
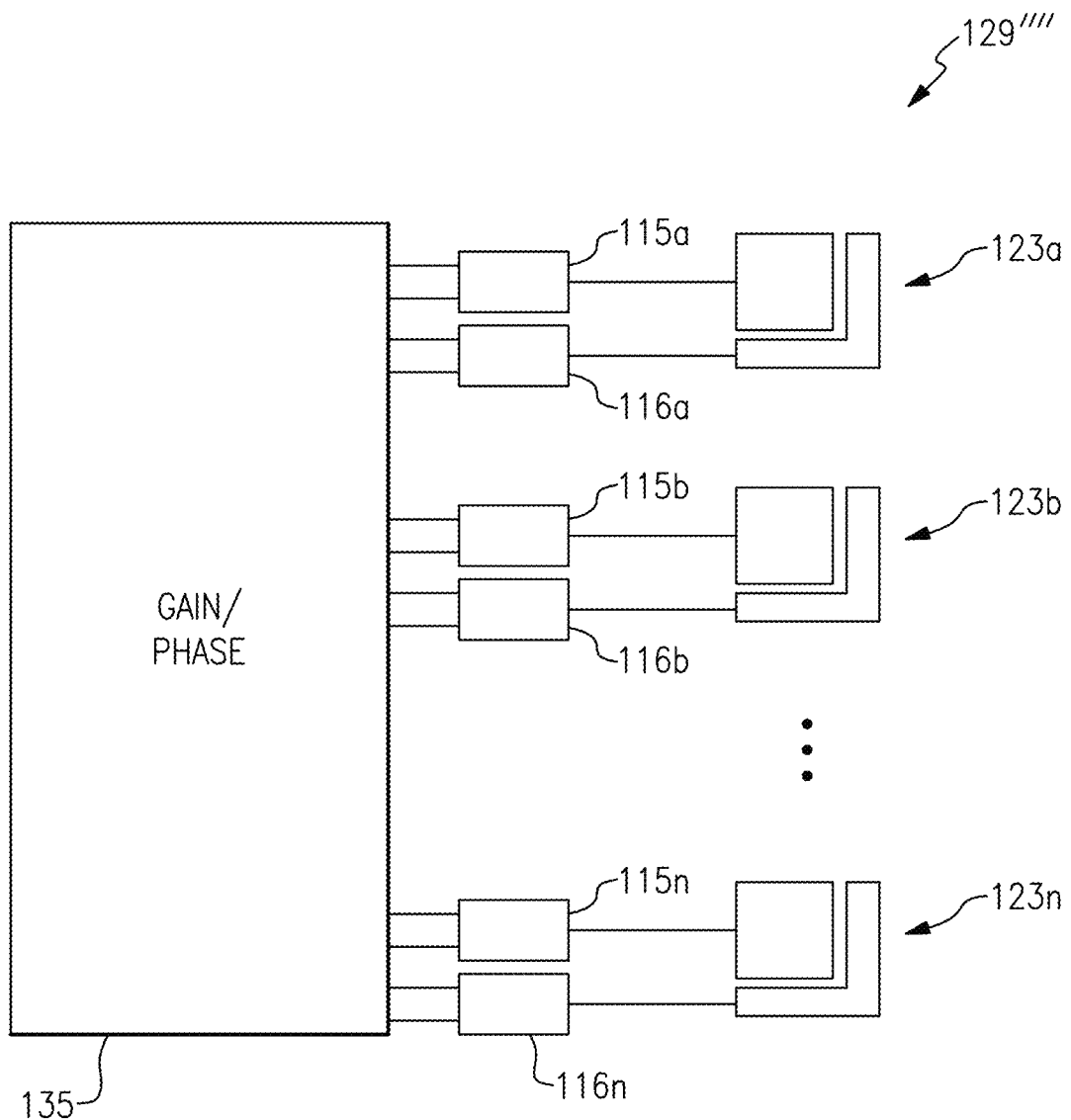
FIG. 5E is a schematic diagram of an antenna system with diplexing according to another embodiment.

FIG. 5E is a schematic diagram of an antenna system 129"" with diplexing according to another embodiment. The antenna system 129"" includes antenna structures 123a, 123b, ... 123n, high frequency signal conditioning circuits 115a, 115b, ... 115n, low frequency signal conditioning circuits 116a, 116b, ... 116n, and gain/phase adjustment circuitry 135.

The antenna system 129"" includes multiple signal channels each implemented in accordance with FIG. 5C (or in accordance with FIG. 5D for implementations in which radial stubs are included for tuning). Each signal channel is coupled to an antenna structure of an antenna array. Additionally, the gain/phase adjustment circuitry 135 provides channel specific gain and phase adjustments to provided beamforming with respect to transmit and/or receive.

Accordingly, the antenna system 129"" illustrates one example of beamforming for an antenna system implemented in accordance with the teachings herein.

Figure 6A:
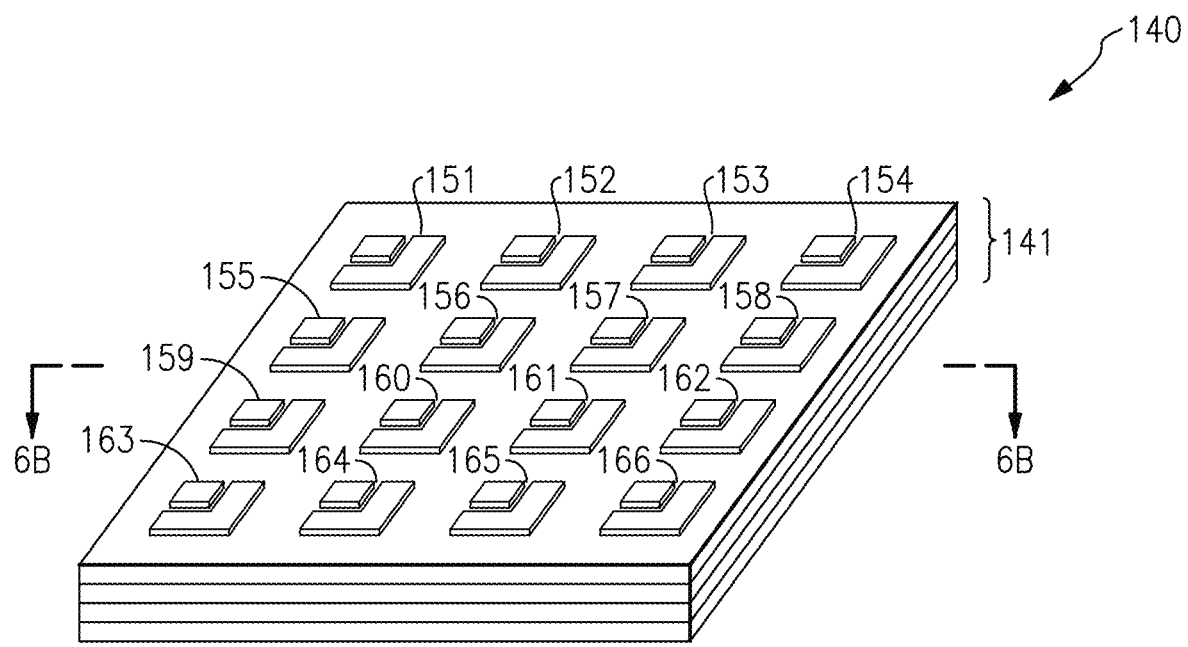
FIG. 6A is a perspective view of one embodiment of a module that operates with beamforming.
Figure 6B:
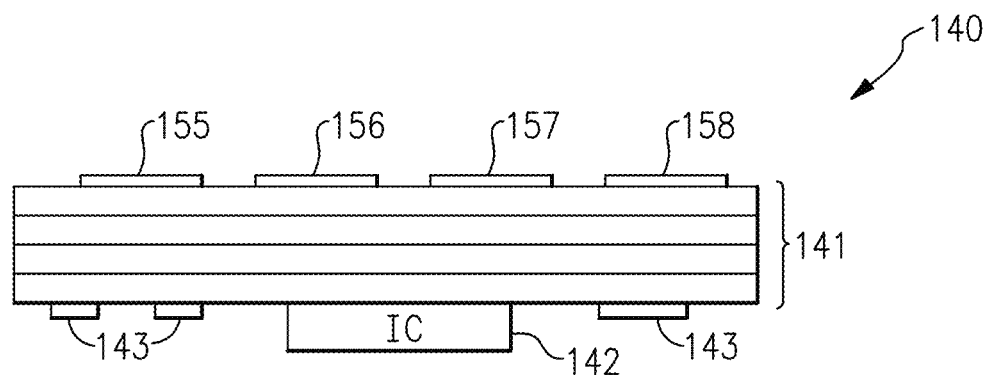
FIG. 6B is a cross-section of the module of FIG. 6A taken along the lines 6B-6B.

FIG. 6A is a perspective view of one embodiment of a module 140 that operates with beamforming. FIG. 6B is a cross-section of the module 140 of FIG. 6A taken along the lines 6B-6B.

The module 140 includes a laminated substrate or laminate 141, a semiconductor die or IC 142, surface mount components 143, and an antenna array including patch antenna structures 151-166 each implemented in accordance with the antenna structure of FIGS. 5A to 5E.

Although one embodiment of a module is shown in FIGS. 6A and 6B, the teachings herein are applicable to modules implemented in a wide variety of ways. For example, a module can include a different arrangement of and/or number of antenna elements, dies, and/or surface mount components. Additionally, the module 140 can include additional structures and components including, but not limited to, encapsulation structures, shielding structures, and/or wirebonds.

In the illustrated embodiment, the antenna structures 151-166 are formed on a first surface of the laminate 141, and can be used to transmit and/or receive signals. Although a 4×4 array of antenna structures is shown, more or fewer antenna elements can be provided. Moreover, antenna structures can be arrayed in other patterns or configurations. Furthermore, in another embodiment, multiple antenna arrays are provided, such as separate antenna arrays for transmit and receive and/or multiple antenna arrays for MIMO and/or switched diversity.

In certain implementations, the antenna structures 151-166 are implemented as patch antennas. A patch antenna can include a planar antenna element positioned over a ground plane. A patch antenna can have a relatively thin profile and exhibit robust mechanical strength. In certain configurations, the antenna structures 151-166 are implemented as patch antennas with planar antenna elements formed on the first surface of the laminate 141 and the ground plane formed using an internal conductive layer of the laminate 141.

In the illustrated embodiment, the IC 142 and the surface mount components 143 are on a second surface of the laminate 141 opposite the first surface.

In certain implementations, the IC 142 includes signal conditioning circuits associated with the antenna structures 151-166. In one embodiment, the IC 142 includes a serial interface, such as a mobile industry processor interface radio frequency front end (MIPI RFFE) bus and/or inter-integrated circuit (I2C) bus that receives data for controlling the signal conditioning circuits, such as the amount of phase shifting provided by phase shifters. In another embodiment, the IC 142 includes signal conditioning circuits associated with the antenna structures 151-166 and an integrated transceiver.

The laminate 141 can be implemented in a variety of ways, and can include for example, conductive layers, dielectric layers, solder masks, and/or other structures. The number of layers, layer thicknesses, and materials used to form the layers can be selected based on a wide variety of factors, which can vary with application. The laminate 141 can include vias for providing electrical connections to signal feeds and/or ground feeds of the antenna elements 151-166. For example, in certain implementations, vias can aid in providing electrical connections between signaling conditioning circuits of the IC 142 and corresponding antenna elements.

The module 140 can be included in a communication system, such as a mobile phone or base station. In one example, the module 140 is attached to a phone board of a mobile phone.

Figure 7:
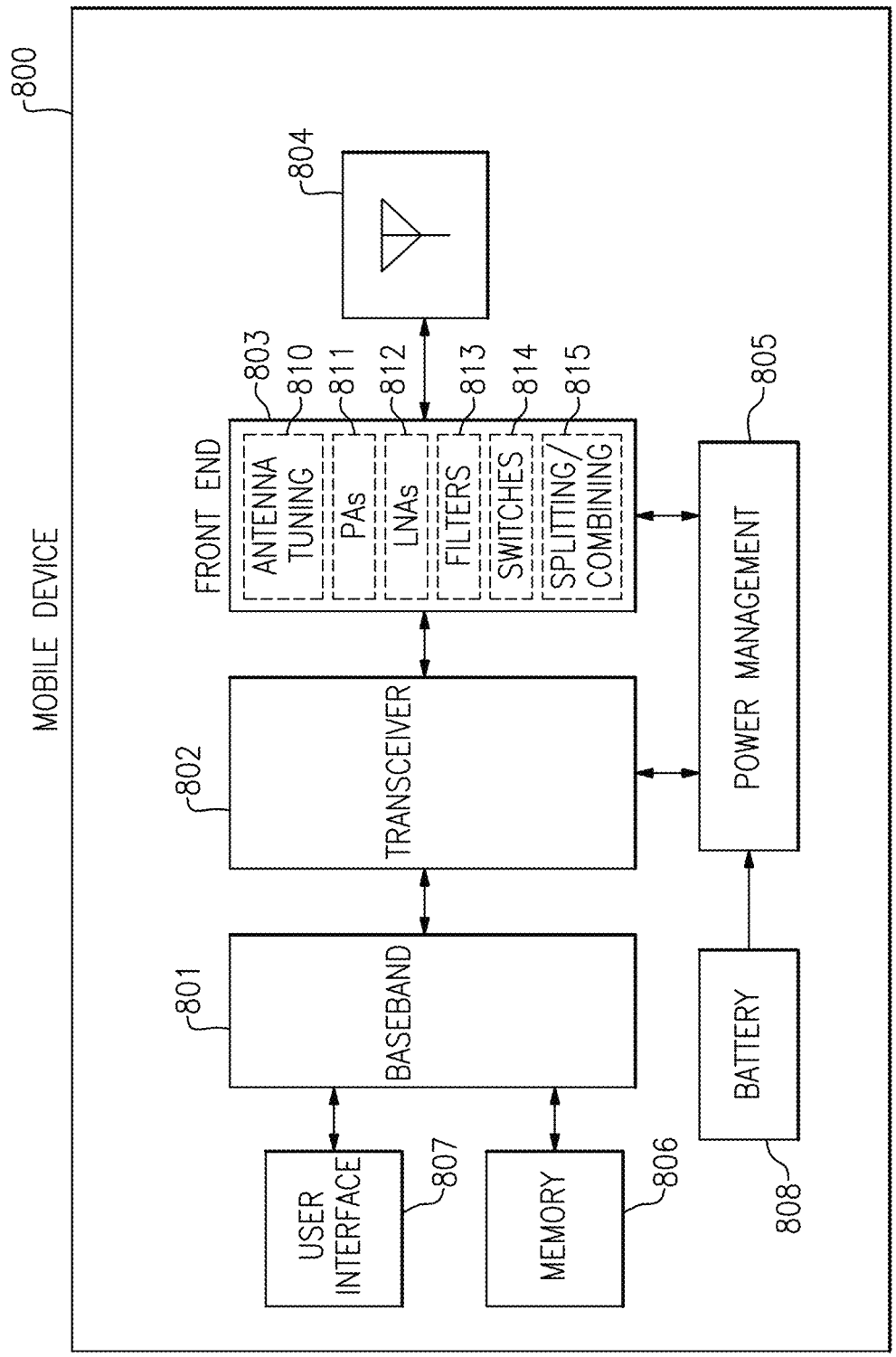
FIG. 7 is a schematic diagram of one embodiment of a mobile device.

FIG. 7 is a schematic diagram of one embodiment of a mobile device 800. The mobile device 800 includes a baseband system 801, a transceiver 802, a front end system 803, antennas 804, a power management system 805, a memory 806, a user interface 807, and a battery 808.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 7 as the transceiver 802. In one example, separate components (for instance, separate circuits or dies) can be provided for handling certain types of RF signals.

The front end system 803 aids in conditioning signals transmitted to and/or received from the antennas 804. In the illustrated embodiment, the front end system 803 includes antenna tuning circuitry 810, power amplifiers (PAs) 811, low noise amplifiers (LNAs) 812, filters 813, switches 814, and signal splitting/combining circuitry 815. However, other implementations are possible.

For example, the front end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front end system 803 can include amplifiers having controllable gain and phase shifters having controllable phase to provide beam formation and directivity for transmission and/or reception of signals using the antennas 804. For example, in the context of signal transmission, the amplitude and phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 7, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 7, the power management system 805 receives a battery voltage from the battery 808. The battery 808 can be any suitable battery for use in the mobile device 800, including, for example, a lithium-ion battery.

Figure 8:
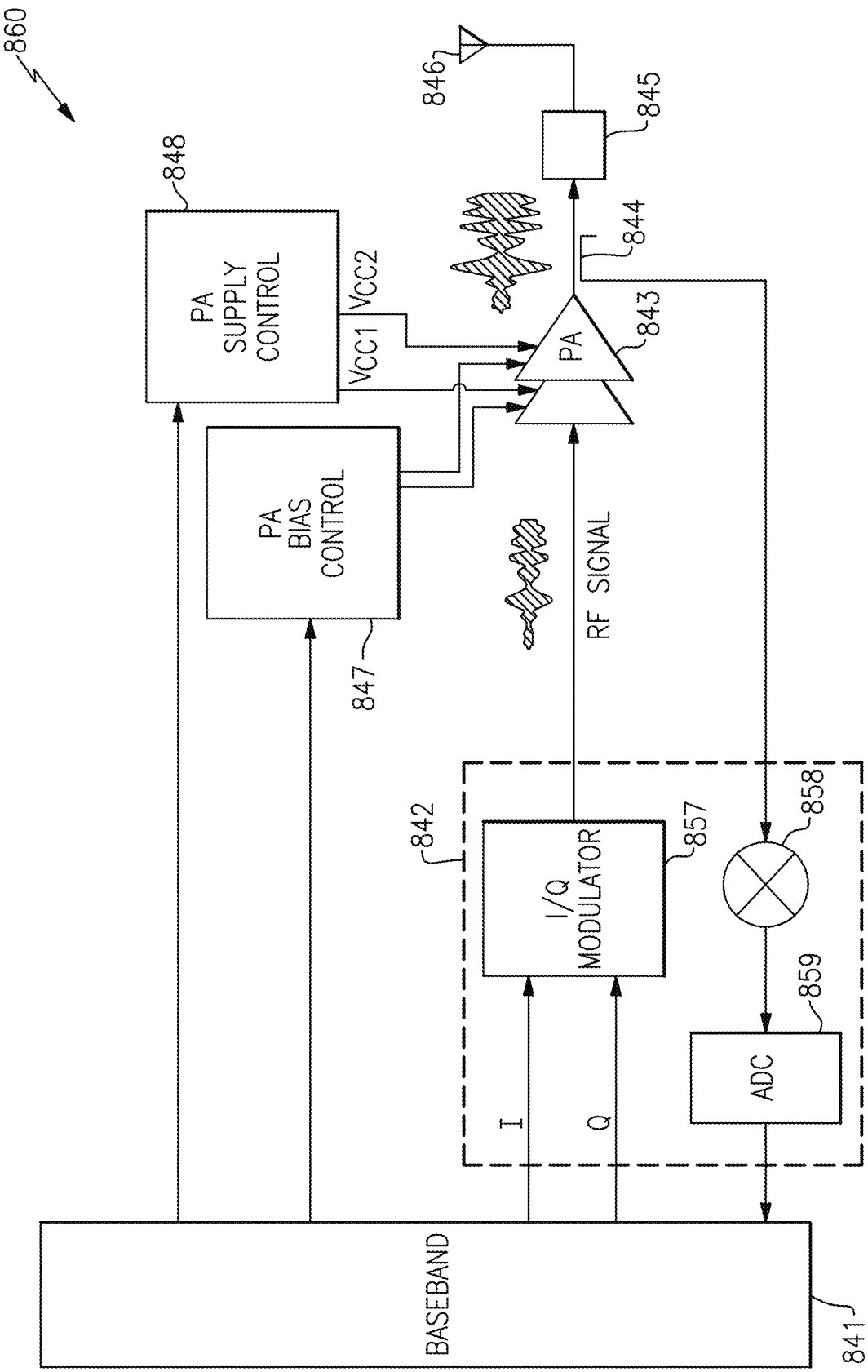
FIG. 8 is a schematic diagram of a power amplifier system according to another embodiment.

FIG. 8 is a schematic diagram of a power amplifier system 860 according to another embodiment. The illustrated power amplifier system 860 includes a baseband processor 841, a transmitter/observation receiver 842, a power amplifier (PA) 843, a directional coupler 844, front end circuitry 845, an antenna 846, a PA bias control circuit 847, and a PA supply control circuit 848. The illustrated transmitter/observation receiver 842 includes an I/Q modulator 857, a mixer 858, and an analog-to-digital converter (ADC) 859. In certain implementations, the transmitter/observation receiver 842 is incorporated into a transceiver.

The baseband processor 841 can be used to generate an in-phase (I) signal and a quadrature-phase (Q) signal, which can be used to represent a sinusoidal wave or signal of a desired amplitude, frequency, and phase. For example, the I signal can be used to represent an in-phase component of the sinusoidal wave and the Q signal can be used to represent a quadrature-phase component of the sinusoidal wave, which can be an equivalent representation of the sinusoidal wave. In certain implementations, the I and Q signals can be provided to the I/Q modulator 857 in a digital format. The baseband processor 841 can be any suitable processor configured to process a baseband signal. For instance, the baseband processor 841 can include a digital signal processor, a microprocessor, a programmable core, or any combination thereof. Moreover, in some implementations, two or more baseband processors 841 can be included in the power amplifier system 860.

The I/Q modulator 857 can be configured to receive the I and Q signals from the baseband processor 841 and to process the I and Q signals to generate an RF signal. For example, the I/Q modulator 857 can include digital-to-analog converters (DACs) configured to convert the I and Q signals into an analog format, mixers for upconverting the I and Q signals to RF, and a signal combiner for combining the upconverted I and Q signals into an RF signal suitable for amplification by the power amplifier 843. In certain implementations, the I/Q modulator 857 can include one or more filters configured to filter frequency content of signals processed therein.

The power amplifier 843 can receive the RF signal from the I/Q modulator 857, and when enabled can provide an amplified RF signal to the antenna 846 via the front end circuitry 845.

The front end circuitry 845 can be implemented in a wide variety of ways. In one example, the front end circuitry 845 includes one or more switches, filters, duplexers, multiplexers, and/or other components. In another example, the front end circuitry 845 is omitted in favor of the power amplifier 843 providing the amplified RF signal directly to the antenna 846.

The directional coupler 844 senses an output signal of the power amplifier 823. Additionally, the sensed output signal from the directional coupler 844 is provided to the mixer 858, which multiplies the sensed output signal by a reference signal of a controlled frequency. The mixer 858 operates to generate a downshifted signal by downshifting the sensed output signal's frequency content. The downshifted signal can be provided to the ADC 859, which can convert the downshifted signal to a digital format suitable for processing by the baseband processor 841. Including a feedback path from the output of the power amplifier 843 to the baseband processor 841 can provide a number of advantages. For example, implementing the baseband processor 841 in this manner can aid in providing power control, compensating for transmitter impairments, and/or in performing digital pre-distortion (DPD). Although one example of a sensing path for a power amplifier is shown, other implementations are possible.

The PA supply control circuit 848 receives a power control signal from the baseband processor 841, and controls supply voltages of the power amplifier 843. In the illustrated configuration, the PA supply control circuit 848 generates a first supply voltage $V_{CC1}$ for powering an input stage of the power amplifier 843 and a second supply voltage $V_{CC2}$ for powering an output stage of the power amplifier 843. The PA supply control circuit 848 can control the voltage level of the first supply voltage $V_{CC1}$ and/or the second supply voltage $V_{CC2}$ to enhance the power amplifier system's PAE.

The PA supply control circuit 848 can employ various power management techniques to change the voltage level of one or more of the supply voltages over time to improve the power amplifier's power added efficiency (PAE), thereby reducing power dissipation.

One technique for improving efficiency of a power amplifier is average power tracking (APT), in which a DC-to-DC converter is used to generate a supply voltage for a power amplifier based on the power amplifier's average output power. Another technique for improving efficiency of a power amplifier is envelope tracking (ET), in which a supply voltage of the power amplifier is controlled in relation to the envelope of the RF signal. Thus, when a voltage level of the envelope of the RF signal increases the voltage level of the power amplifier's supply voltage can be increased. Likewise, when the voltage level of the envelope of the RF signal decreases the voltage level of the power amplifier's supply voltage can be decreased to reduce power consumption.

In certain configurations, the PA supply control circuit 848 is a multi-mode supply control circuit that can operate in multiple supply control modes including an APT mode and an ET mode. For example, the power control signal from the baseband processor 841 can instruct the PA supply control circuit 848 to operate in a particular supply control mode.

As shown in FIG. 8, the PA bias control circuit 847 receives a bias control signal from the baseband processor 841, and generates bias control signals for the power amplifier 843. In the illustrated configuration, the bias control circuit 847 generates bias control signals for both an input stage of the power amplifier 843 and an output stage of the power amplifier 843. However, other implementations are possible.

Applications

Some of the embodiments described above have provided examples in connection with wireless devices or mobile phones. However, the principles and advantages of the embodiments can be used for any other systems or apparatus that have needs for antenna systems.

Such antenna systems can be implemented in various electronic devices. Examples of the electronic devices can include, but are not limited to, consumer electronic products, parts of the consumer electronic products, electronic test equipment, etc. Examples of the electronic devices can also include, but are not limited to, memory chips, memory modules, circuits of optical networks or other communication networks, and disk driver circuits. The consumer electronic products can include, but are not limited to, a mobile phone, a telephone, a television, a computer monitor, a computer, a hand-held computer, a personal digital assistant (PDA), a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A mobile device comprising:
   a front end system including a first signal conditioning circuit configured to condition a first radio frequency signal of a first frequency, and a second signal conditioning circuit configured to condition a second radio frequency signal of a second frequency that is lower than the first frequency; and
   an antenna structure configured to diplex the first radio frequency signal and the second radio frequency signal, the antenna structure including a rectangular-shaped antenna configured to handle the first radio frequency signal and an L-shaped antenna electromagnetically coupled to the rectangular-shaped antenna and configured to handle the second radio frequency signal, the L-shaped antenna including a first portion along a first side of the rectangular-shaped antenna and a second portion along a second side of the rectangular-shaped antenna, the antenna structure further including a first radial stub extending from a third side of the rectangular-shaped antenna opposite the first side.

2. The mobile device of claim 1 wherein the first radio frequency signal is a first carrier aggregation signal and the second radio frequency signal is a second carrier aggregation signal.

3. The mobile device of claim 1 wherein the rectangular-shaped antenna is a first patch antenna and the L-shaped antenna is a second patch antenna.

4. The mobile device of claim 1 wherein the antenna structure further includes a signal feed between the second portion of the L-shaped antenna and the second signal conditioning circuit, and a second radial stub extending from the signal feed.

5. The mobile device of claim 3 wherein the first frequency is between 24 gigahertz and 52 gigahertz, and the second frequency is between 52 gigahertz and 71 gigahertz.

6. The mobile device of claim 1 wherein an end of the second portion of the L-shaped antenna is aligned with the third side of the rectangular-shaped antenna, and an end of the first portion of the L-shaped antenna is aligned with a fourth side of the rectangular-shaped antenna opposite the second side.

7. The mobile device of claim 1 wherein the first signal conditioning circuit includes a first power amplifier configured to output the first radio frequency signal and having an output directly connected to the rectangular-shaped antenna, and the second signal conditioning circuit includes a second power amplifier configured to output the second radio frequency signal and having an output directly connected to the L-shaped antenna.

8. The mobile device of claim 1 wherein the first signal conditioning circuit includes a first low noise amplifier configured to receive the first radio frequency signal and having an input directly connected to the rectangular-shaped antenna, and the second signal conditioning circuit includes a second low noise amplifier configured to receive the second radio frequency signal and having an input directly connected to the L-shaped antenna.

9. A radio frequency module comprising:
a module substrate;
a semiconductor die attached to the module substrate and including a first signal conditioning circuit configured to condition a first radio frequency signal of a first frequency, and a second signal conditioning circuit configured to condition a second radio frequency signal of a second frequency that is lower than the first frequency; and
an antenna structure on the module substrate and configured to diplex the first radio frequency signal and the second radio frequency signal, the antenna structure including a rectangular-shaped antenna configured to handle the first radio frequency signal and an L-shaped antenna electromagnetically coupled to the rectangular-shaped antenna and configured to handle the second radio frequency signal, the L-shaped antenna including a first portion along a first side of the rectangular-shaped antenna and a second portion along a second side of the rectangular-shaped antenna, the antenna structure further including a first radial stub extending from a third side of the rectangular-shaped antenna opposite the first side.

10. The radio frequency module of claim 9 wherein the first radio frequency signal is a first carrier aggregation signal and the second radio frequency signal is a second carrier aggregation signal.

11. The radio frequency module of claim 9 wherein the rectangular-shaped antenna is a first patch antenna and the L-shaped antenna is a second patch antenna.

12. The radio frequency module of claim 9 wherein the antenna structure further includes a signal feed between the second portion of the L-shaped antenna and the second signal conditioning circuit, and a second radial stub extending from the signal feed.

13. The radio frequency module of claim 9 wherein the first signal conditioning circuit includes a first low noise amplifier configured to receive the first radio frequency signal and having an input directly connected to the rectangular-shaped antenna, and the second signal conditioning circuit includes a second low noise amplifier configured to receive the second radio frequency signal and having an input directly connected to the L-shaped antenna.

14. The radio frequency module of claim 9 wherein the first signal conditioning circuit includes a first power amplifier configured to output the first radio frequency signal and having an output directly connected to the rectangular-shaped antenna, and the second signal conditioning circuit includes a second power amplifier configured to output the second radio frequency signal and having an output directly connected to the L-shaped antenna.

15. A method of wireless communication in a mobile device, the method comprising:
conditioning a first radio frequency signal of a first frequency using a first signal conditioning circuit;
conditioning a second radio frequency signal of a second frequency that is lower than the first frequency using a second signal conditioning circuit;
diplexing the first radio frequency signal and the second radio frequency signal using an antenna structure that includes a rectangular-shaped antenna and an L-shaped antenna that are electromagnetically coupled to one another, including handling the first radio frequency signal using the rectangular-shaped antenna and handling the second radio frequency signal using the L-shaped antenna, the L-shaped antenna including a first portion along a first side of the rectangular-shaped antenna and a second portion along a second side of the rectangular-shaped antenna; and
tuning the first patch antenna using a first radial stub extending from a third side of the rectangular-shaped antenna opposite the first side.

16. The method of claim 15 wherein the antenna structure further includes a signal feed between the second portion of the L-shaped antenna and the second signal conditioning circuit, the method further comprising tuning the L-shaped antenna using and a second radial stub extending from the signal feed.

17. The method of claim 15 wherein the first radio frequency signal is a first carrier aggregation signal and the second radio frequency signal is a second carrier aggregation signal.

18. The method of claim 15 wherein the rectangular-shaped antenna is a first patch antenna and the L-shaped antenna is a second patch antenna.

19. The method of claim 15 wherein conditioning the first radio frequency signal includes amplifying the first radio frequency signal using a first power amplifier having an output directly connected to the rectangular-shaped antenna.

20. The method of claim 15 wherein conditioning the first radio frequency signal includes receiving the first radio frequency signal as an input to a first low noise amplifier, the first low noise amplifier having an input directly connected to the rectangular-shaped antenna.

\* \* \* \* \*